United States Patent [19]
Demmeler et al.

[11] Patent Number: 5,318,284
[45] Date of Patent: Jun. 7, 1994

[54] TABLE, PARTICULARLY ORIENTING AND WELDING TABLE

[75] Inventors: Ludwig Demmeler; Johannes Demmeler, both of Boos, Fed. Rep. of Germany

[73] Assignee: Demmeler Maschinenbau GmbH & Co. KG, Heimertingen, Fed. Rep. of Germany

[21] Appl. No.: 976,168

[22] Filed: Nov. 13, 1992

[30] Foreign Application Priority Data

Nov. 15, 1991 [DE] Fed. Rep. of Germany ... 9114218[U]
Nov. 15, 1991 [DE] Fed. Rep. of Germany ... 9114219[U]
Nov. 15, 1991 [DE] Fed. Rep. of Germany ... 9114220[U]

[51] Int. Cl.$^5$ ............................................. B25B 1/00
[52] U.S. Cl. ...................................... 269/88; 269/91; 269/303; 269/203; 269/900; 269/93
[58] Field of Search .................. 269/900, 88, 45, 303, 269/305, 91, 93, 203, 139; 144/286, 286 A, 287; 248/188.2

[56] References Cited
U.S. PATENT DOCUMENTS

| | | | |
|---|---|---|---|
| 3,188,078 | 6/1965 | Peterson | 269/305 |
| 4,291,869 | 9/1981 | Hickman | 269/139 |
| 4,625,951 | 12/1986 | Yang | 269/88 |
| 4,867,427 | 9/1989 | Cunningham | 269/900 |

OTHER PUBLICATIONS

"Modular Fixturing" by Edward G. Hoffman Manufacturing Technology Press, 1987.

*Primary Examiner*—Robert C. Watson
*Attorney, Agent, or Firm*—Michael J. Striker

[57] ABSTRACT

A table, particularly an orienting and welding table comprises a table plate having a surface provided with uniformly distributed cylindrical throughgoing openings arranged in a grid with a uniform distance therebetween.

20 Claims, 6 Drawing Sheets

TABLE, PARTICULARLY ORIENTING AND WELDING TABLE

BACKGROUND OF THE INVENTION

The present invention relates to a table, and in particular to an orienting and welding table.

Tables of the above mentioned general type are known in the art. The known tables are used for assembling devices, frames and the like from individual parts and then fixing them with welding points. The known tables can be further improved.

SUMMARY OF THE INVENTION

Accordingly, it is an object of the present invention to provide a table, in particular an adjusting and welding table, which is designed so that devices, frames and the like can be exactly assembled from their individual parts in simple and rational way and then fixed by welding points.

In keeping with these objects and with others which will become apparent hereinafter, one feature of the present invention resides, briefly stated, in a table in which a table plate is provided over its whole surface with uniformly distributed cylindrical throughgoing openings arranged in a uniform grid of for example 10 cm.

When the table is designed in accordance with the present invention, pins, screw clamps and similar mounting means can be inserted in the openings and therefore the individual components can be exactly fixed.

It is advantageous when in accordance with the present invention lateral downwardly projecting walls are arranged on the table plate and also provided with cylindrical openings distributed in accordance with the same grid. Due to the lateral walls and their throughgoing openings, a further fixing possibility for the devices and frames to be assembled are provided.

A very favorable and stable fixing possibility is provided in accordance with the present invention when substantially angular supports with at least two legs arranged perpendicular to one another are releasably mounted on the table plate and/or the lateral walls. The legs can be provided also with cylindrical openings and/or with elongated cutouts of the same width. It is therefore possible to fix the supports by simple pins on the table plate or the lateral walls and to provide each required intermediate space for the mounting of the structural components. The angular design of the supports provides for an exact orientation in the height.

In accordance with another embodiment of the present invention, the C-shaped support provided with three legs are arranged on the table plate and/or lateral walls. They abut with their one leg against the table. The central leg extends perpendicularly upwardly, while the third leg extends parallel to the table plate or the lateral walls and at a distance from them. Therefore, a further parallel surface is provided, which is very advantageous for fixing of complicated frames.

It is further advantageous when in accordance with the present invention several supports are connected with one another one behind the other, and at least one support abuts with its leg against the table and is connected with it through an opening. Due to the arrangement one behind the other, very complicated special arrangements can be assembled and they can be drawn at the end or in the central region for fixing of the parts to be assembled.

It is especially advantageous when in accordance with the present invention the table plate is provided with exchangeable legs which have a variable length due to their fit adjustable within narrow ranges. Due to the exchangeability of the legs, the table can be brought to different heights. This is very advantageous for handling frames and the like of different sizes. With the adjustable fit, the table can be brought exactly to a horizontal position and moreover the floor unevenness can be easily compensated.

In accordance with a further embodiment of the present invention, the table with a screw clamp is provided with a longitudinal strut which has a cross-section corresponding to the openings of the table, and a screw spindle is arranged on the longitudinal strut for fine adjustment and application of the clamping force. The longitudinal strut is composed of two parts including an outer supporting pipe and an inner longitudinal displaceable strut which carries the screw spindle. Due to the combination of the table with the thusly designed screw clamp, a simple and at the same time accurate clamping of the structural components is possible. With this screw clamp the longitudinal strut is bent under load and thereby the clamped parts can tilt. Due to the bending of the longitudinal strut held in the throughgoing opening of the table the transverse strut of the inventive screw clamp can elongate and therefore no lateral force acts on the clamped part.

It is especially advantageous when in accordance with the present invention the transverse strut is fixedly arranged on the end of the longitudinal strut and forms with it an angle of approximately 100°. Due to this arrangement practically no friction force acts inside both parts of the transverse strut. Therefore the length of the transverse strut can be easily adjusted to the predetermined bending of the longitudinal strut.

It is advantageous when in accordance with the present invention a return spring is arranged inside the transverse strut and in unloaded condition holds the strut in the inserted position inside the supporting pipe. Thereby the displaceable strut always returns to its initial position and no additional adjustment is needed.

For the design of the inventive screw clamp, it is advantageous when the inner strut of the transverse strut is provided with an elongated recess, and a pin mounted in the supporting pipe engages in the recess. Therefore the transverse movement of the inner strut is limited.

An especially simple and reliable operation of the return spring is provided when a pressure spring is arranged inside the elongated recess and serves as a return spring.

It is very advantageous when in accordance with the present invention the transverse strut is displaceably supported on the longitudinal strut, and the transverse strut supports a clamping device for fixing the transverse strut on the longitudinal strut. Therefore it is possible to insert the screw clamp with longitudinal struts of any length, since the required length is easily adjustable between the longitudinal strut and the transverse strut.

In accordance with a further embodiment of the invention, the table is provided with a pin for releasable connection of the table with the structural component which is also provided with openings or the like having a circular or an elongated cross-section and provided with cylindrical or parallel walls. The pin is provided with an axially displaceable threaded spindle which is fixedly connected with an outwardly extending handle or the like formed as a clamping member. The threaded spindle at its another end is provided with a peg or the like which engages with blocking means pressable from the pin in the radial direction.

The pin extends in two cylindrical or elongated throughgoing openings which are aligned with one another. By turning the handle the blocking means is pressed out and hooks behind the throughgoing opening. The handle is pulled through the threaded spindle against the hooked structural component and both structural components are clamped with one another. Therefore a very rationally operating clamping device is provided. For releasing this connection, the handle must be turned back and therefore the peg releases the blocking means and the pin can be withdrawn.

It is very advantageous when in accordance with the present invention the peg is arranged at the end of the threaded spindle which is opposite to the handle and is provided at its opposite end with a conical portion. During turning the threaded spindle into the pin the conical portion presses outwardly the blocking means. Therefore a very simple and operationally secure construction is provided.

In accordance with a further embodiment of the present invention, at the end of the conical portion a peg having a thinner cross-section is arranged, and the blocking means abuts against it in the inserted position. This prevents uncontrolled displacement of the blocking means into the interior of the pin.

In accordance with a further advantageous embodiment of the present invention, the blocking means is formed by balls arranged in radial openings of the pin housing. The utilization of the balls as the blocking means is very advantageous since they are wear resistant, easy to handle and assemble, and also price favorable. Also, the balls can be easily inserted into the radial openings provided for them.

The radial openings for receiving the balls can be easily produced from outside and can be then upset at least in points at their housing outer side. Therefore the balls received in the openings can not fall out of the openings outwardly.

In accordance with the present invention it is advantageous when the pin housing is provided with a blind hole for receiving the threaded spindle. Therefore the pin housing is closed at its lower side and protected from dirt and welding particles which can cause operational failures.

This situation is further improved when in accordance with the present invention the end of the pin housing for insertion of the threaded spindle is provided with a ring-shaped projection which can be rolled in. After the final mounting of the pin this projection can be rolled in and therefore the housing can be completely closed.

For the handling of the pin it is very advantageous when in accordance with the present invention the pin housing has a peripheral groove which receives a rubber ring or the like. The rubber ring or the like applies during turning of the handle a braking moment on the pin housing, so that the pin housing does not rotate with it until the blocking means is engaged.

It is very advantageous when in accordance with a further feature of the present invention the handle is cylindrical and has a greater diameter than the pin housing. Thereby the handle can be used directly as a clamping member.

A handling of the pin is further improved when in accordance with the present invention, the peripheral surface of the cylindrical handle has a knurling. In this construction the handle can be easily engaged and turned.

For easily tightening of the pin the handle in accordance with a further embodiment of the present invention can be provided with a central opening for receiving a turning tool, for example a hexagonal wrench.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
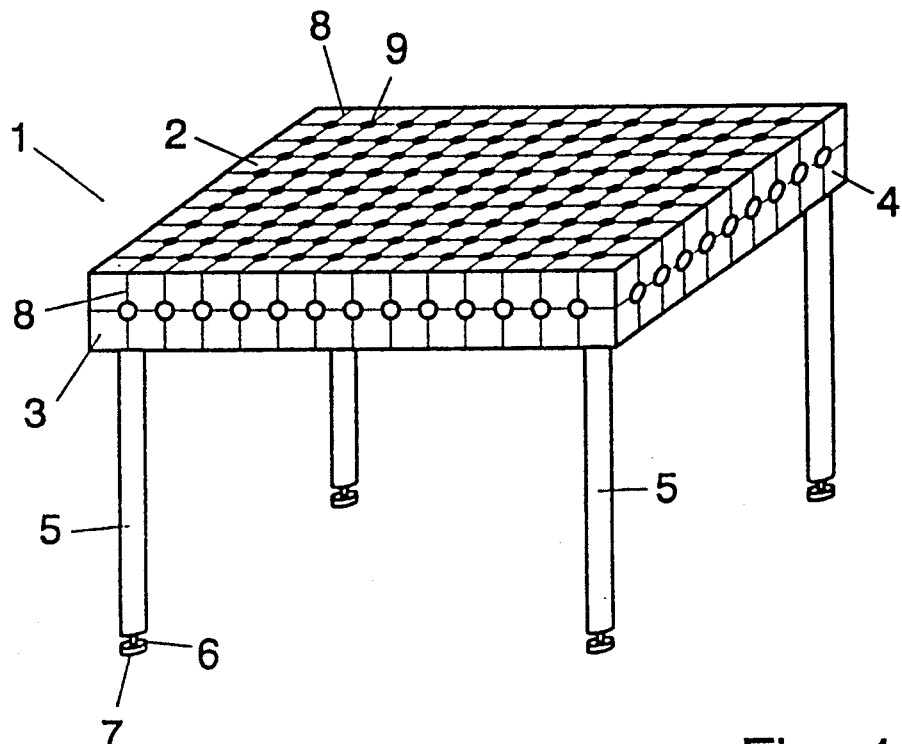
FIG. 1 is a perspective view showing a table in accordance with the present invention having a plurality of cylindrical throughgoing openings in its table plate and in its walls.

A table in accordance with the present invention is identified as a whole with reference numeral 1. It has a table plate 2 and lateral walls 3 and 4 which are arranged on the table plate and extend perpendicularly downwardly from it. Four legs 5 are screwed on the lower side of the table plate 2. At their lower ends they are provided with feet 7 which are vertically adjustable by threaded spindles 6. Since the legs are exchangeable and the feet are adjustable, a high degree of adaptability of the table to different conditions is provided.

The table plate 2 is provided with a grid line network having grid lines 8. The grid lines extend from respective outer edges and are spaced from one another by uniform distances of 10 cm. A throughgoing opening 9 is provided in the intersecting point of the grid lines 8 and extend at a right angle relative to the surface of the table plate. The grid lines 8 also extend over the edges of the table plate 2 to the lateral walls 3 and 4. The lateral walls are also provided with throughgoing openings 9. Markings in form of continuous numbers or size data can be provided on the arresting lines 8.

Figure 2:
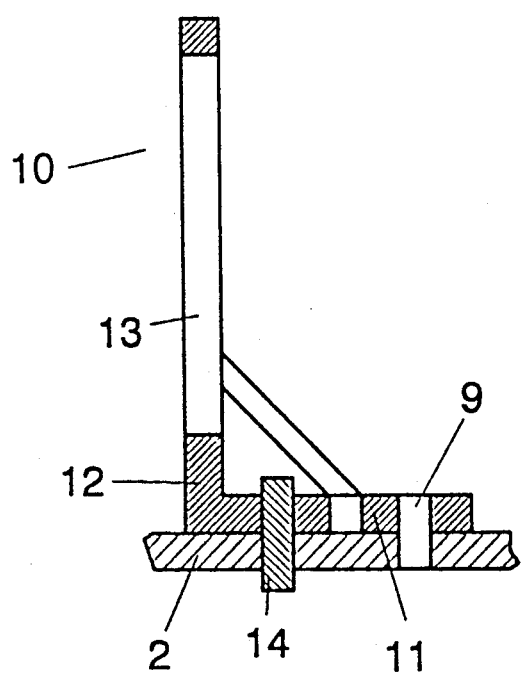
FIG. 2 is a view showing an angular strut which is mounted by a pin on the inventive table.

In FIG. 2 an angular support 10 is placed on the table plate 2 and has two legs 11 and 12 which extend perpendicular to one another. One leg 11 is also provided with the throughgoing openings 9 spaced from one another by a half pitch of the openings in the table plate. In other words they are spaced from one another by a distance of 5 cm. The other leg 13 has an elongated cutout 13 with a width corresponding to the diameter of the throughgoing openings 9. The angular support 10 abuts with its leg 11 against the table plate and is connected with the latter by a pin 14. Structural components for assembling complicated welded constructions can be reliably mounted in accordance with their sizes on the thusly arranged support.

Figure 3:
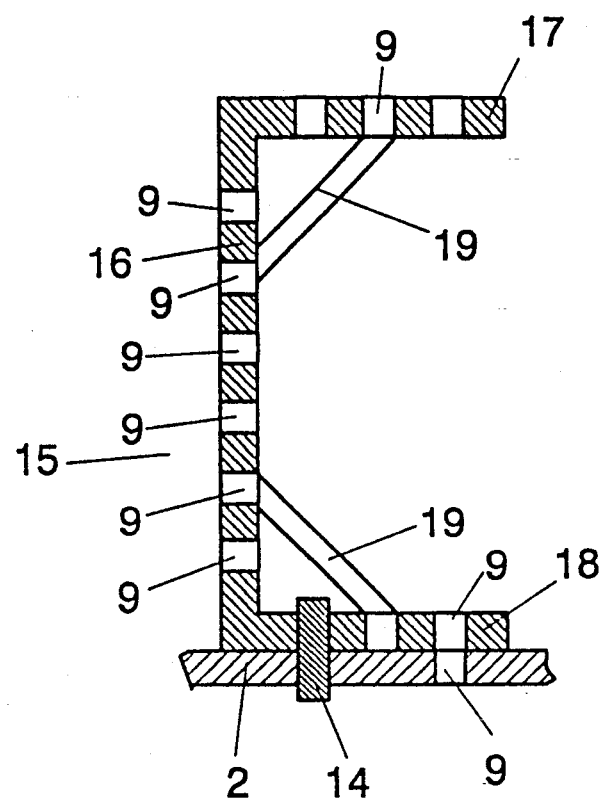
FIG. 3 is a view showing a C-shaped strut which abuts with its shorter leg against a table plate.

In the embodiment of FIG. 3 the C-shaped support 15 is arranged on the table plate 2. Its three legs 16, 17, and 18 are provided with throughgoing openings 9. The neighboring legs are connected with one another by inclined struts 19 to provide a high degree of rigidity especially for large supports. With such a support, a fixation of the structural components from above is provided. Therefore, even in the cases of great heights a reliable fixation in all three directions can be obtained.

Figure 4:
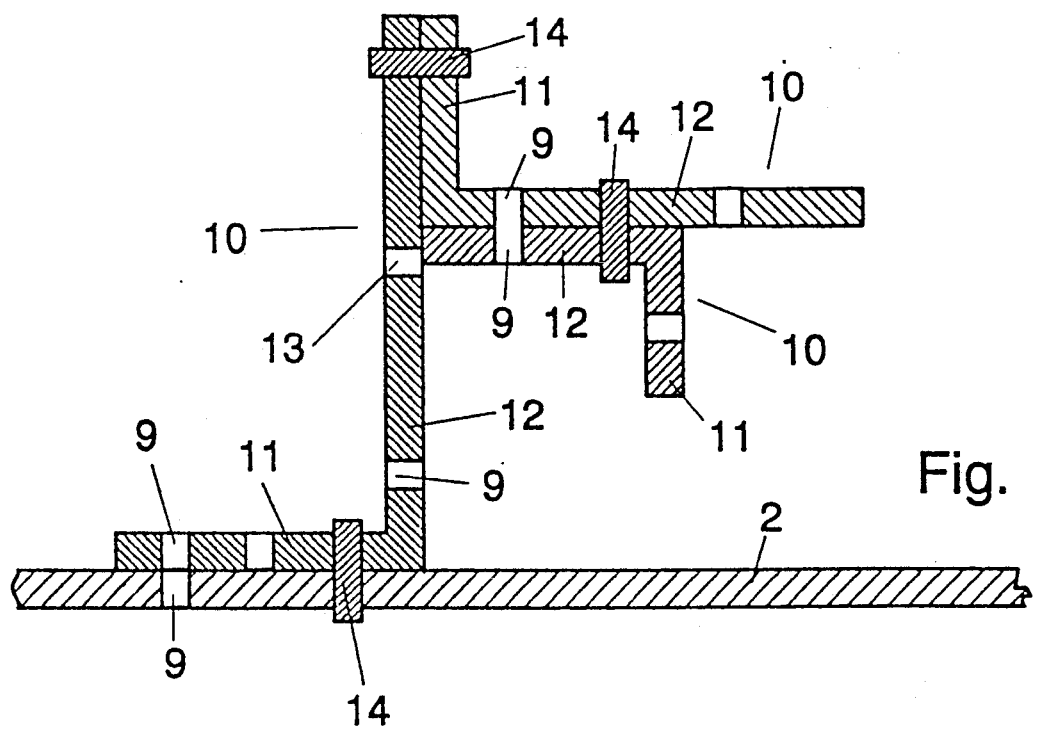
FIG. 4 is a view showing several angular struts arranged one behind the other and mounted on the table plate.

FIG. 4 shows several angular supports 10 which are arranged one after the other and connected by pins 14. The supports can therefore have different sizes and designs to ensure complicated assembling processes.

Figure 5:
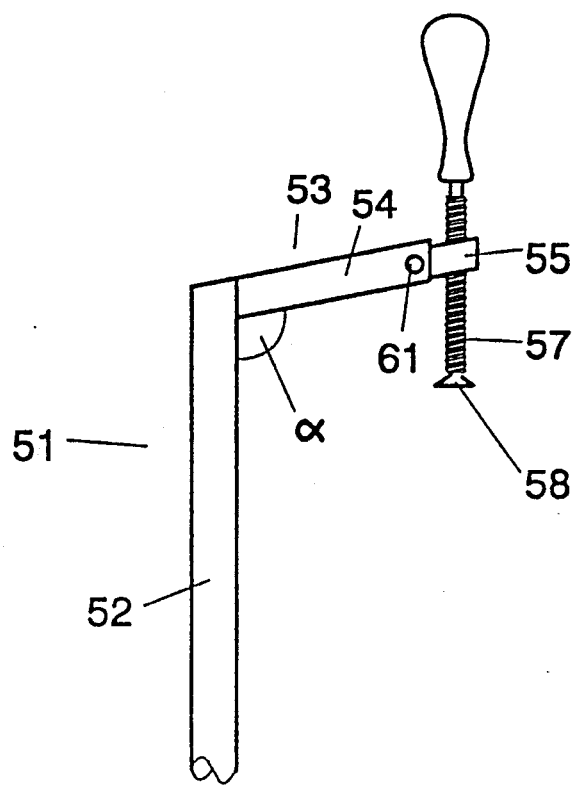
FIG. 5 is a view showing a screw clamp with a tubular, longitudinal strut and a transverse strut composed of a rectangular supporting pipe and a strut with a corresponding cross-section.
Figure 6:
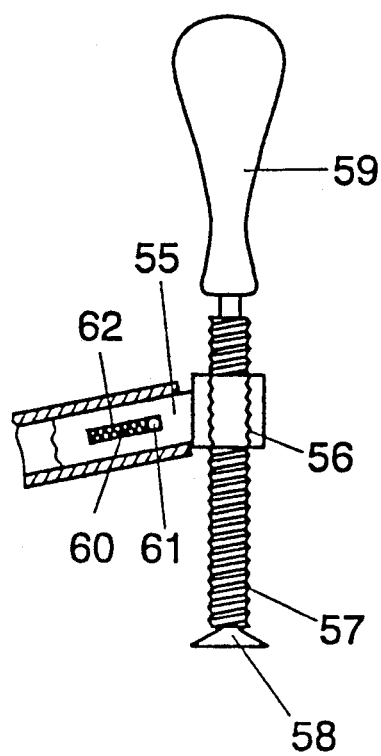
FIG. 6 is a partial view of the transverse strut of FIG. 5 in a section.

FIG. 5 shows a screw clamp identified with reference numeral 51. It is provided with a longitudinal strut 52 having a pipe of a circular cross-section. A transverse strut 53 is arranged on the end of the longitudinal strut 52 and has a supporting pipe 54 of a rectangular cross-section and also a strut 55 which is longitudinally displaceable in the supporting pipe 54. The strut 55 has a cross-section corresponding to the inner dimension of the supporting pipe 54. The transverse strut 53 or the supporting pipe 54 form with the longitudinal strut 52 an angle of 100°–102°.

A threaded opening 56 extends parallel to the longitudinal strut 52 in the end of the strut 55 which is placed from the longitudinal strut. A threaded spindle 57 is screwed in the threaded opening 56. The spindle has a lower end which carries a rotatably supported circular plate 58 and an upper end which is provided with a turning handle 59. In a portion extending into the supporting pipe 54, the strut 55 has an elongated opening 60 which extends in its longitudinal direction. A pin 61 provided on the supporting pipe 54 engages in the opening 60 and limits the longitudinal movements of the strut. A pressure spring 62 has one end engaging with the pin 61 and another end extending in the elongated opening 60. The spring operates as a return spring for the strut and presses the latter in its inserted position.

Figure 7:
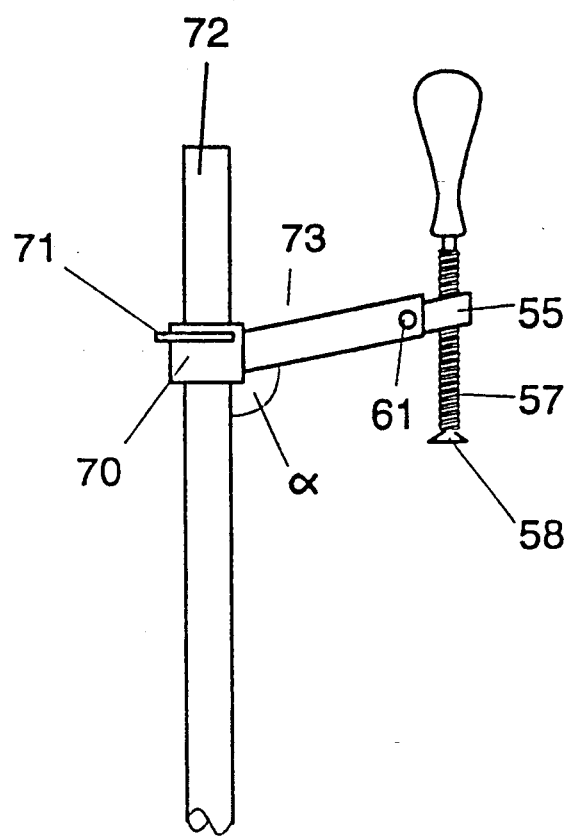
FIG. 7 is a view showing a further screw clamp with a longitudinal strut located in a throughgoing opening of the table and a transverse strut arranged displaceably on the longitudinal strut.

In the embodiment shown in FIG. 7 a bearing 70 is provided for the transverse strut 73 so as to longitudinally displaceably support the transverse strut 73 on the longitudinal strut 72. For fixing both struts with one another, a clamping device 71 is arranged in the bearing 70 of the transverse strut 73.

Figure 8:
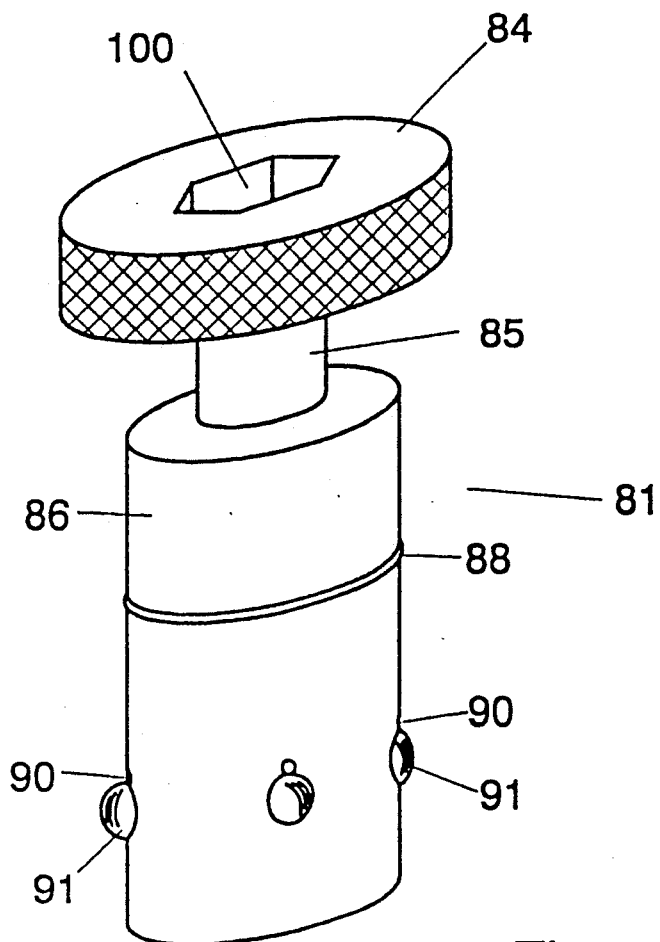
FIG. 8 is a perspective view of a pin with a knurled handle and three balls which form blocking means.
Figure 9:
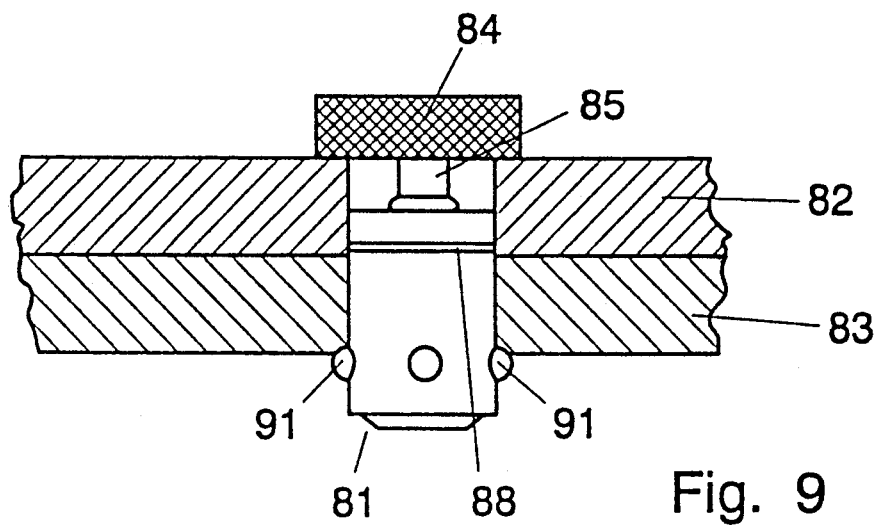
FIG. 9 is a view showing two plate-shaped structural components with a pin inserted in them.
Figure 10:
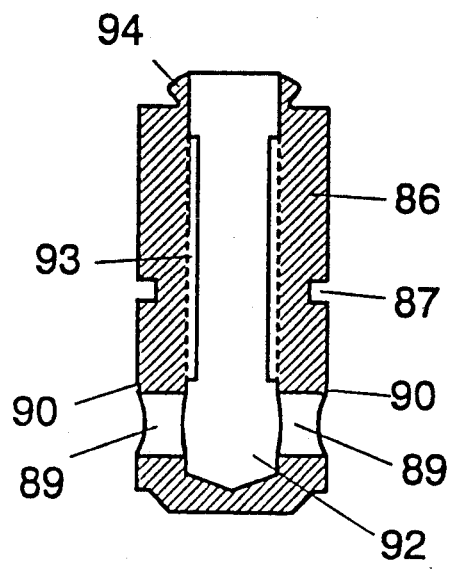
FIG. 10 is a view showing a longitudinal section of a housing of the pin.
Figure 11:
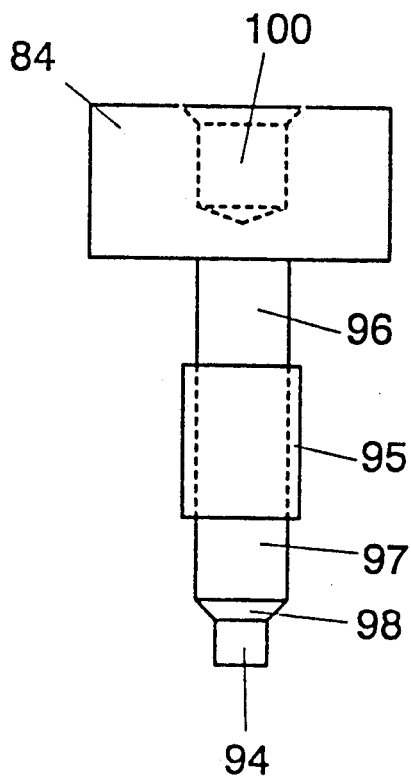
FIG. 11 is a view showing an inner spindle of the pin.

In FIG. 8 the pin is identified with reference numeral 81 and operates for fixing two structural components 82 and 83 provided with throughgoing openings as shown in FIG. 9. The component 83 can be for example the table 2. The throughgoing openings of the components 82 and 83 are formed as cylindrical throughgoing openings or as elongated cutouts with parallel walls for receiving the pin 81 with a small play. The pin 81 has an upper end provided with a handle 84 and connected with a spindle 85 for joint rotation. The spindle 85 extends in the housing 86 of the pin 81. The housing has a circumferential groove 87 which receives a rubber ring 88. Four radial openings 89 are provided in the lower end region of the housing 86. Subsequently they are formed with an upset 90 from outside, and balls 91 are inserted in it from inside. Due to the narrowing cross-section obtained by the upsetting at the outer side of the openings 89, the balls cannot completely extend outwardly from the openings and therefore are securely retained in them. The housing 86 of the pin is provided inwardly with a blind hole 92. The portion of the blind hole 92 which is located above the radial opening 89 is provided with an inner thread 93. The upper end of the housing 86 of the pin has a ring-shaped projection 94 which is flanged inwardly assembling the pin.

The handle 84 is connected with a threaded spindle 95 for joint rotation therewith, and the threaded spindle is screwed in the inner thread 93 of the housing 86 of the pin. A spindle portion 96 of a somewhat smaller diameter is provided between the handle 84 and the threaded spindle 95, and the projection 94 is flanged against it for sealing the pin from above. A cylindrical part 27 with a conical portion 98 at its lower end is provided above the threaded spindle 25. The lower end of this spindle part forms a peg 99 located directly on the conical portion.

In the maximum withdrawn position of the spindle part, the balls 91 abut against the pegs 99. During turning of the threaded spindle in, they are pressed by the conical portion 98 outwardly and then held by the cylindrical part 97 in their outer position. The balls abut against chamfered edge of a throughgoing opening of the structural component 83, and the rubber ring prevents a co-rotation of the pin. When also the handle 84 abuts against the other structural component 82, the balls roll in the abutment surface. They rotate on the inner side on the cylindrical portion 97 and on the outer side of the abutment surface, so that a rolling corresponding to a planetary transmission is performed.

For tightening the pin with application of more force, the handle 84 is provided with a hexagonal opening 100 for receiving a hexagonal wrench.

It will be understood that each of the elements described above, or two or more together, may also find a useful application in other types of constructions differing from the types described above.

While the invention has been illustrated and described as embodied in a table, particularly and orienting and welding table, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A table, particularly an orienting and welding table, comprising a table plate having a surface provided with uniformly distributed cylindrical throughgoing openings arranged in a grid with a uniform distance therebetween; a screw clamp; a longitudinal strut having a circular cross-section corresponding to a cross section of said throughgoing openings; a transverse strut; a screw spindle arranged on said transverse strut for adjustment and application of a clamping force, said transverse being composed of two parts including an outer supporting pipe and an inner longitudinally supported strut member which carries said screw spindle; and a return spring arranged inside said transverse strut and holding said strut member in unloaded condition in an inserted position inside said supporting pipe.

2. A table as defined in claim 1, wherein said distance is substantially equal to 10 cm.

3. A table as defined in claim 1, and further comprising lateral walls extending downwardly from said table plate and also having cylindrical throughgoing openings arranged in a grid with the same distance therebetween.

4. A table as defined in claim 1, wherein said longitudinal strut has an end, said transverse strut being arranged at said end of said longitudinal strut and forming with said longitudinal strut an angle of substantially 100°.

5. A table as defined in claim 1, wherein said strut member of said transverse strut is provided with an elongated recess, said supporting pipe having a engaging in said recess and therefore limiting a transverse movement of said strut member.

6. A table as defined in claim 1; and further comprising a clamping device arranged on said transverse strut for fixing said transverse strut on said longitudinal strut.

7. A table, particularly an orienting and welding table, comprising a table plate having a surface provided with uniformly distributed cylindrical throughgoing openings arranged in a grid with a uniform distance therebetween; a pin for releasable connection of the table with a structural component which also has openings and is provided with walls, said pin having an axially extending threading spindle; a handle fixed with said threaded spindle for joint rotation therewith and formed as an outer clamping member; a peg provided on another end of said threaded spindle; and blocking means pressable outwardly from said pin in a radial direction and acted by said peg.

8. A table as defined in claim 7, wherein said threaded spindle has an end facing away of said handle and provided with said peg, said peg having an end facing away of said threaded spindle and provided with a conical portion which during turning of the threaded spindle into said pin presses outwardly said blocking means.

9. A table as defined in claim 8, wherein said peg has a thinner portion arranged at an end of said conical portion so that said blocking means abut against said thinner portion in inserted position.

10. A table as defined in claim 9, wherein said table plate has exchangeable legs provided with adjustable feet so as to change the length of said legs within a small range.

11. A table as defined in claim 7, wherein said blocking means include a plurality of balls, said pin having a housing provided with radial openings in which said balls are accommodated.

12. A table as defined in claim 11, wherein said radial openings for receiving said balls are set up at least in individual points at an outer side of said housing.

13. A table as defined in claim 7; and further comprising a pin housing provided with a blind hole for receiving said threaded spindle.

14. A table as defined in claim 7; and further comprising a pin housing having an end formed for inserting of said threaded spindle and provided with a ring-shaped projection.

15. A table as defined in claim 7; and further comprising a pin housing having a circumferential groove; and a sealing element arranged in said circumferential groove.

16. A table as defined in claim 15, wherein said sealing element is formed as a rubber ring.

17. A table as defined in claim 7; and further comprising a pin housing, said handle being cylindrical and having a diameter which is greater than a diameter of said pin housing.

18. A table as defined in claim 17, wherein said handle has a peripheral surface provided with knurling.

19. A table as defined in claim 7, wherein said handle is provided with a central opening for receiving a turning tool.

20. A table, particularly an orienting and welding table, comprising a table plate having a surface provided with uniformly distributed cylindrical throughgoing openings arranged in a grid with a uniform distance therebetween: a screw clamp; a longitudinal strut having a circular cross-section corresponding to a cross section of said throughgoing openings; a transverse strut for adjustment and application of a clamping force, said transverse being composed of two parts including an outer supporting pipe and an inner longitudinally supported strut member which carries said screw spindle, said strut member of said transverse strut being provided with an elongated recess, said supporting pipe having a pin engaging in said recess and therefore limiting a transverse movement of said strut member; and a pressure spring arranged inside said elongated recess and formed as a return spring.

* * * * *